US012594445B2

(12) United States Patent
Vallamkondu et al.

(10) Patent No.: US 12,594,445 B2
(45) Date of Patent: *Apr. 7, 2026

(54) ADDRESSING OPTICAL FIRING CARTRIDGE USING CHROMATIC ABERRATION

(71) Applicant: Kidde Technologies, Inc., Wilson, NC (US)

(72) Inventors: Aswin Kumar Vallamkondu, Karnataka (IN); Terry Simpson, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 1086 days.

This patent is subject to a terminal disclaimer.

(21) Appl. No.: 17/675,172

(22) Filed: Feb. 18, 2022

(65) Prior Publication Data

US 2023/0264055 A1 Aug. 24, 2023

(51) Int. Cl.
*A62C 3/08* (2006.01)
*A62C 37/48* (2006.01)

(52) U.S. Cl.
CPC ................ *A62C 3/08* (2013.01); *A62C 37/48* (2013.01)

(58) Field of Classification Search
CPC ........... A62C 37/46; A62C 37/40; A62C 3/08; A62C 37/11; A62C 37/42; A62C 37/48; A62C 99/009; A62C 35/08; A62C 35/13; A62C 35/10; A62C 35/11
USPC ............................ 169/47, 26, 28, 62, 74, 89
See application file for complete search history.

(56) References Cited

U.S. PATENT DOCUMENTS

| | | | | |
|---|---|---|---|---|
| 3,884,307 | A | 5/1975 | Williams | |
| 3,915,237 | A | 10/1975 | Roznieck | |
| 7,784,403 | B2 | 8/2010 | Moulard et al. | |
| 12,157,027 | B2 * | 12/2024 | Vallamkondu | A62C 35/13 |
| 2016/0136468 | A1 | 5/2016 | Kosovski-Shahor | |
| 2021/0020882 | A1 * | 1/2021 | Coreth | G08B 29/188 |

FOREIGN PATENT DOCUMENTS

| | | | |
|---|---|---|---|
| CN | 201213989 | Y | 4/2009 |
| CN | 204612617 | U | 9/2015 |
| WO | 19999000343 | A1 | 1/1999 |

OTHER PUBLICATIONS

European Search Report for European Application No. 23153818.2; dated Jul. 17, 2023; 74 pages.

* cited by examiner

*Primary Examiner* — Christopher R Dandridge
(74) *Attorney, Agent, or Firm* — CANTOR COLBURN LLP

(57) ABSTRACT

A fire protection system includes two or more fire extinguishers. Each fire extinguisher includes a housing, the housing including an extinguisher outlet and a burst disk. The burst disk is configured to retain a volume of fire suppressant material in the housing. A firing cartridge is operably connected to the housing and includes an output charge, and an ignition charge that, when detonated, causes release of the output charge to rupture the burst disk and release the volume of fire suppressant material through the extinguisher outlet. An optical fiber is configured to transmit a light signal toward the ignition charge to heat and detonate the ignition charge. A light source is operably connected to the optical fiber to selectably transmit a first light signal to selectably activate a first fire extinguisher or a second fire extinguisher of the two or more fire extinguishers.

19 Claims, 4 Drawing Sheets

ADDRESSING OPTICAL FIRING CARTRIDGE USING CHROMATIC ABERRATION

BACKGROUND

Exemplary embodiments pertain to the art of fire protection systems, and in particular to firing mechanisms for fire extinguishers of fire protection systems.

In fire protection systems, such as those used in aircraft, fire extinguishers utilize electrical firing cartridges to puncture a burst disk in the fire extinguisher, resulting in the release of extinguishing agent from the fire extinguisher. In such systems, an electrical pulse is generated and transmitted to the firing cartridge to activate the fire extinguisher. On detection of a fire, an electrical pulse is transmitted to each fire extinguisher separately for activation of the firing cartridge.

In such systems, there is no addressing or differentiation mechanism for the selective activation of each fire extinguisher, and individual wires must be run for connection to each of the fire extinguishers. Electrical cable losses must be accounted for in such configurations, and a high current firing circuit must be designed and installed in a remote location, with high current cable wire run to each fire extinguisher.

BRIEF DESCRIPTION

In one embodiment, a fire protection system includes two or more fire extinguishers. Each fire extinguisher of the two or more fire extinguishers includes a housing, the housing including an extinguisher outlet and a burst disk. The burst disk is configured to retain a volume of fire suppressant material in the housing. A firing cartridge is operably connected to the housing. The firing cartridge includes an output charge, and an ignition charge that, when detonated, causes release of the output charge to rupture the burst disk and release the volume of fire suppressant material through the extinguisher outlet. An optical fiber is configured to transmit a light signal toward the ignition charge to heat and detonate the ignition charge, and a light source is operably connected the optical fiber. The light source is configured to selectably transmit a first light signal to activate a first fire extinguisher of the two or more fire extinguishers, or transmit a second light signal to activate a second fire extinguisher of the two or more fire extinguishers.

Additionally or alternatively, in this or other embodiments the first light signal is a first wavelength and the second light signal is a second wavelength different from the first wavelength.

Additionally or alternatively, in this or other embodiments a hub is located between the light source and the optical fiber of each fire extinguisher of the two or more fire extinguishers.

Additionally or alternatively, in this or other embodiments each fire extinguisher of the two or more fire extinguishers further includes a bridge wire located between the optical fiber and the ignition charge, the light signal configured to heat the bridge wire to detonate the ignition charge.

Additionally or alternatively, in this or other embodiments each fire extinguisher of the two or more fire extinguishers includes a lens located between the optical fiber and the bridge wire, the lens configured to converge the light signal at the bridge wire to heat the bridge wire.

Additionally or alternatively, in this or other embodiments the lens of the first fire extinguisher is positioned to converge the first light signal at the bridge wire of the first fire extinguisher, and the lens of the second fire extinguisher is positioned to converge the second light signal at the bridge wire of the second fire extinguisher.

Additionally or alternatively, in this or other embodiments the light source is a laser.

Additionally or alternatively, in this or other embodiments a sensor is operably connected to the light source. The sensor is configured to detect a fire or smoke condition to initiate operation of the light source.

Additionally or alternatively, in this or other embodiments the first light signal is configured to activate the first fire extinguisher but not activate the second fire extinguisher.

Additionally or alternatively, in this or other embodiments the first light signal is an IR wavelength and the second light signal is a blue light wavelength.

In another embodiment, a method of operating a fire protection system includes providing two or more fire extinguishers. Each fire extinguisher of the two or more fire extinguishers includes a housing, the housing including an extinguisher outlet, and a burst disk. The burst disk is configured to retain a volume of fire suppressant material in the housing. A firing cartridge is operably connected to the housing. The firing cartridge includes an output charge and an ignition charge that, when detonated, causes release of the output charge to rupture the burst disk and release the volume of fire suppressant material through the extinguisher outlet. A first light signal or a second light signal is selectably transmitted from a light source along an optical fiber toward the ignition charge of a corresponding first fire extinguisher or second fire extinguisher of the two or more fire extinguishers. The ignition charge is heated via the corresponding light signal, thereby detonating the ignition charge of the corresponding first or second fire extinguisher.

Additionally or alternatively, in this or other embodiments the first light signal is a first wavelength and the second light signal is a second wavelength different from the first wavelength.

Additionally or alternatively, in this or other embodiments the first light signal and the second light signal are transmitted to each of the two or more first extinguishers via a hub located between the light source and the optical fiber of each fire extinguisher of the two or more fire extinguishers.

Additionally or alternatively, in this or other embodiments each fire extinguisher of the two or more fire extinguishers further includes a bridge wire located between the optical fiber and the ignition charge. The light signal is configured to heat the bridge wire to detonate the ignition charge.

Additionally or alternatively, in this or other embodiments each fire extinguisher of the two or more fire extinguishers includes a lens located between the optical fiber and the bridge wire. The lens is configured to converge the light signal at the bridge wire to heat the bridge wire.

Additionally or alternatively, in this or other embodiments the lens of the first fire extinguisher is positioned to converge the first light signal at the bridge wire of the first fire extinguisher, and the lens of the second fire extinguisher is positioned to converge the second light signal at the bridge wire of the second fire extinguisher.

In yet another embodiment, an aircraft includes an aircraft structure, and a fire protection system located in the aircraft structure. The fire protection system includes two or more fire extinguishers. Each fire extinguisher of the two or more fire extinguishers includes a housing, the housing including an extinguisher outlet and a burst disk. The burst disk is configured to retain a volume of fire suppressant material in the housing. A firing cartridge is operably connected to the housing. The firing cartridge includes an output charge and an ignition charge that, when detonated, causes release of the output charge to rupture the burst disk and release the volume of fire suppressant material through the extinguisher outlet. An optical fiber is configured to transmit a light signal toward the ignition charge to heat and detonate the ignition charge. A light source is operably connected to each fire extinguisher of the two or more fire extinguishers. The light source is configured to selectably transmit a first light signal to activate a first fire extinguisher of the two or more fire extinguishers, or transmit a second light signal to activate a second fire extinguisher of the two or more fire extinguishers.

Additionally or alternatively, in this or other embodiments the first light signal is a first wavelength and the second light signal is a second wavelength different from the first wavelength.

Additionally or alternatively, in this or other embodiments each fire extinguisher of the two or more fire extinguishers further includes a bridge wire located between the optical fiber and the ignition charge. The light signal is configured to heat the bridge wire to detonate the ignition charge.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
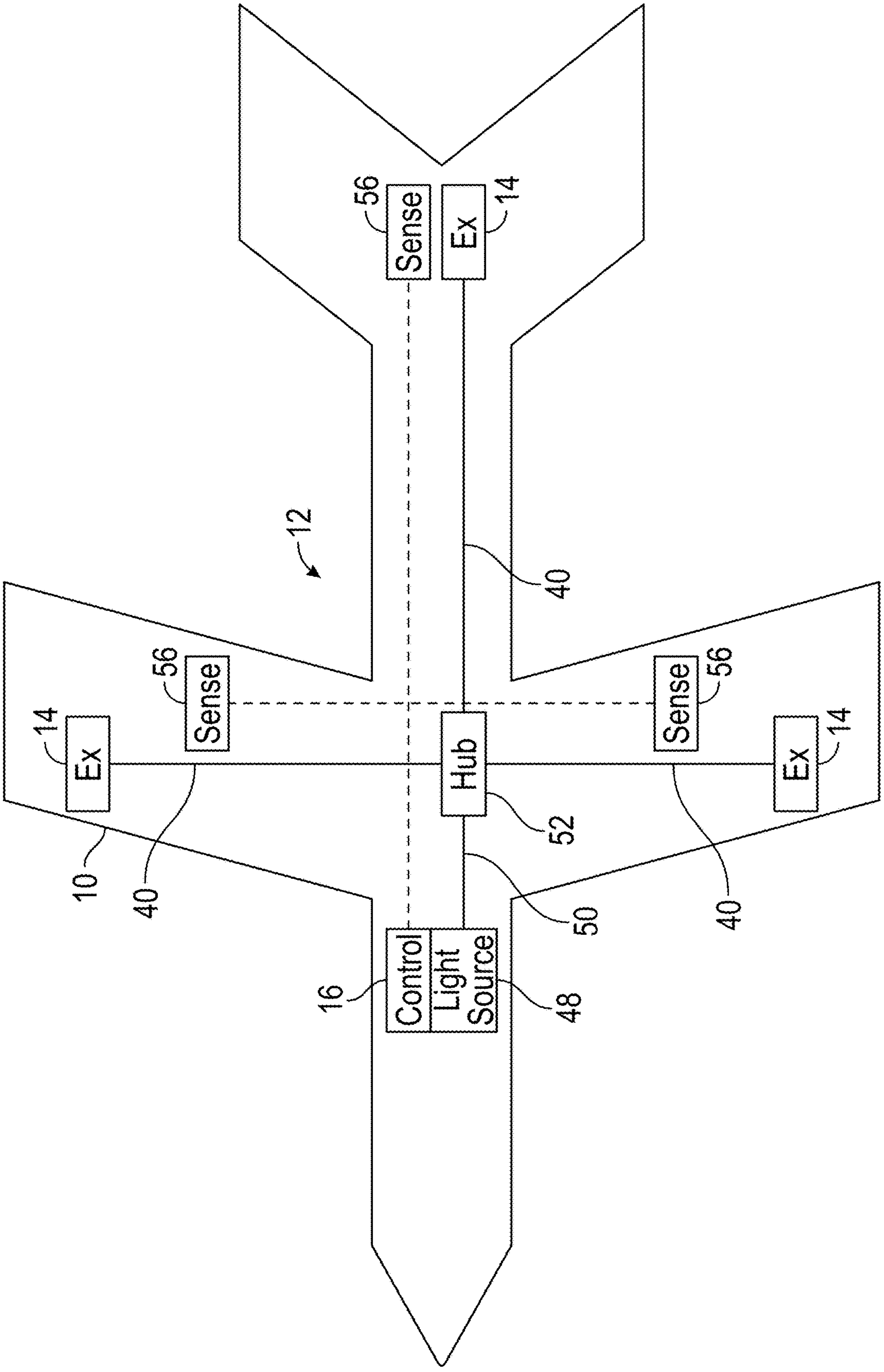
FIG. 1 is a schematic illustration of an embodiment of an aircraft, including a fire protection system.

FIG. 1 is a schematic illustration of an aircraft 10. The aircraft 10 includes a fire protection system 12 including one or more fire extinguishers 14. The fire extinguishers 14 may be arrayed around the aircraft 10 at selected locations. Further, while described herein in the context of an aircraft 10, one skilled in the art will readily appreciate that the fire protection system 12 described herein may be utilized in other applications, such as buildings, trucks, trains, or the like. The fire extinguishers 14 are operably connected to a controller 16 located in the aircraft 10.

Figure 2:
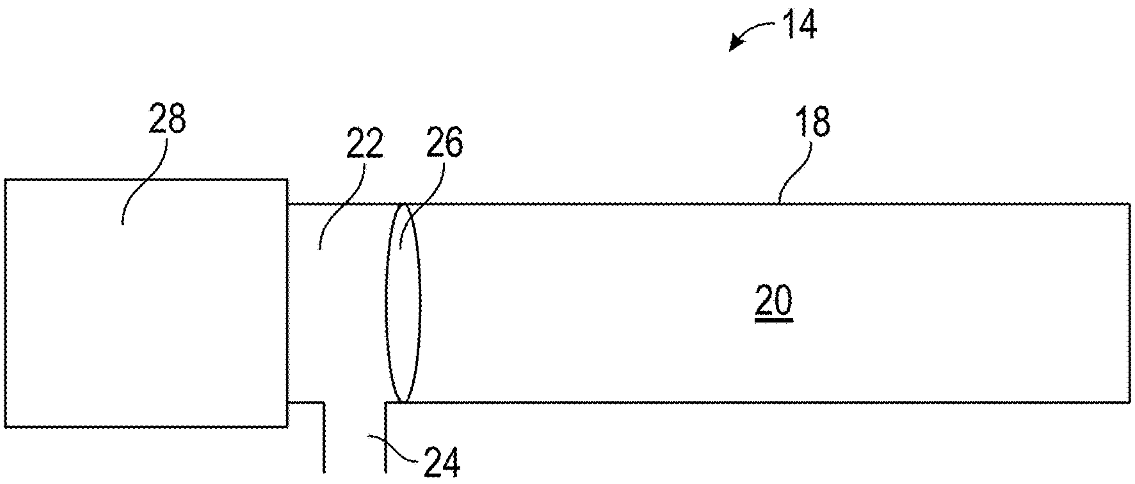
FIG. 2 is a schematic illustration of an embodiment of a fire extinguisher of a fire protection system.

Referring now to FIG. 2, illustrated is an embodiment of a fire extinguisher 14. The fire extinguisher 14 includes an extinguisher housing 18 or tank containing a volume of fire suppressant material 20. The fire extinguisher 14 includes a nozzle portion 22 having an extinguisher outlet 24 through which the fire suppressant material 20 is expelled from the fire extinguisher 14. A burst disk 26 or diaphragm is located in the extinguisher housing 18 and retains the fire suppressant material 20 until operation of the fire extinguisher 14 is initiated by rupturing of the burst disk 26.

A firing cartridge 28 is operably connected to the fire extinguisher 14 such that when the firing cartridge 28 is activated the burst disk 26 is ruptured, and the fire suppressant material 20 flows from the extinguisher housing 18 and through the extinguisher outlet 24.

Figure 3:
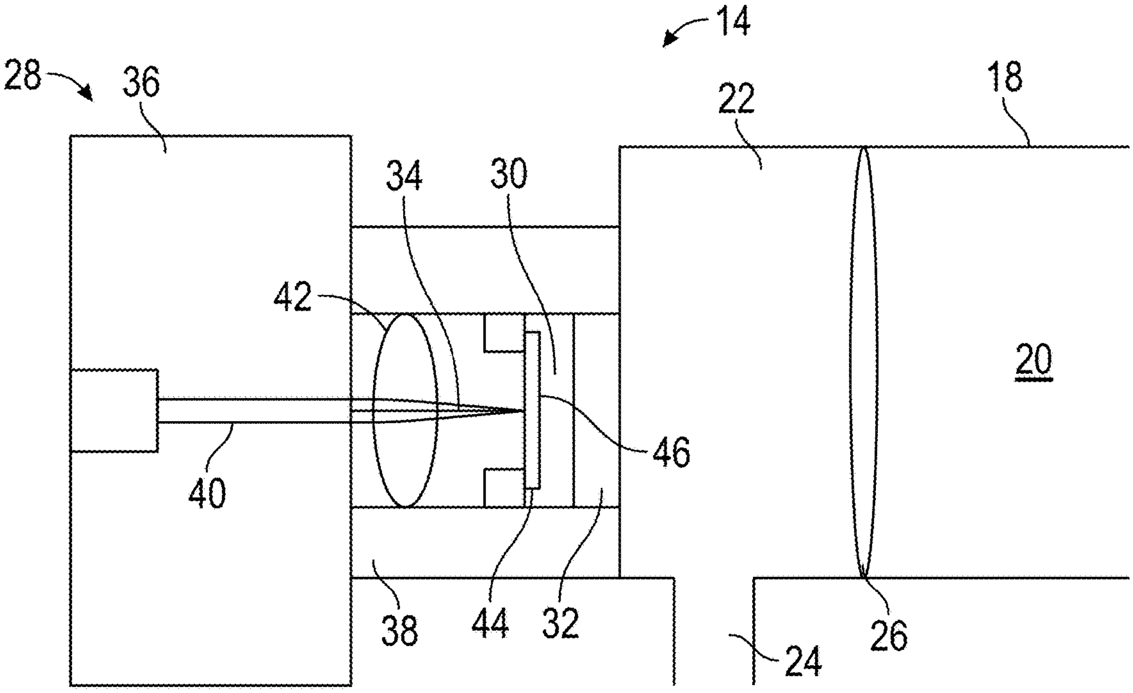
FIG. 3 is a schematic illustration of an embodiment of a firing cartridge of a fire extinguisher.

Referring now to FIG. 3, the firing cartridge 28 including an ignition charge 30 and an output charge 32. When the ignition charge 30 is activated, the ignition charge 30 ignites the output charge 32, which when activated ruptures the burst disk 26.

In the present disclosure, a light signal 34 is utilized to activate the ignition charge 30 The firing cartridge 28 includes a connector housing 36 connected to a cartridge housing 38, and includes an optical fiber 40 along which the light signal 34 is transmitted. The light signal 34 is transmitted through a lens 42 located between the optical fiber 40 and a bridge wire 44 extending across the ignition charge 30. The lens 42 is configured and positioned such that a lens focal point 46 is located at the bridge wire 44, such that the light signal 34 converges at the bridge wire 44 to heat the bridge wire 44 to the ignition temperature of the ignition charge 30. The ignition charge 30 is thus detonated initiating output charge 32 to puncture the burst disk 26 and release the fire suppressant material 20. While in the embodiment of FIG. 3 a bridge wire 44 is utilized to ignite the ignition charge 30, in other embodiments the light signal 34 may be converged on other elements to heat the ignition charge 30, or the bridge wire 44 may be omitted and the light signal 34 may be converged directly onto the ignition charge 30 to heat and detonate the ignition charge 30.

Referring again to FIG. 1, the light signal 32 is emitted from a light source 48, which in some embodiments is a laser, which is operably connected to the controller 16, which controls operation of the light source 48. The light signal 32 is transmitted from the light source 48 along a main optical fiber 50 to a hub 52. From the hub 52, the light signal 32 is transmitted along each optical fiber 40 to each fire extinguisher 14. The light source 48 is tunable to selectable activate one or more of the fire extinguishers 14, while not activating the remaining fire extinguishers 14, based on a wavelength of the light signal 32 emitted from the light source 48.

Figure 4:
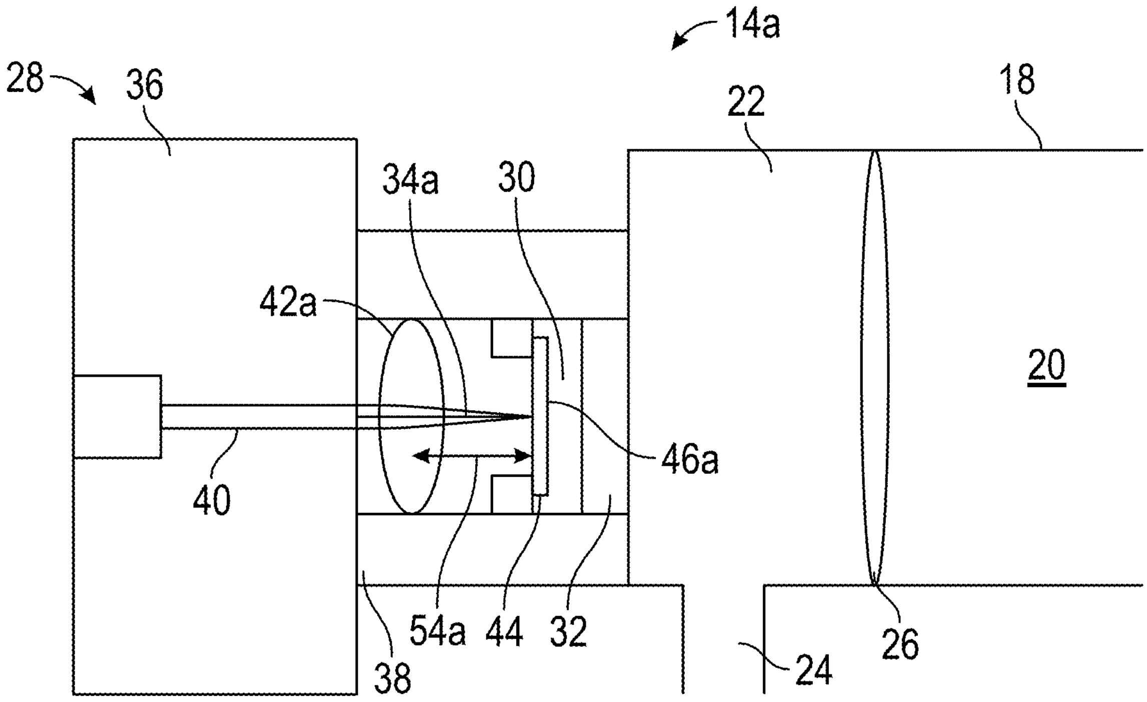
FIG. 4 is a schematic illustration of another embodiment of a firing cartridge.
Figure 5:
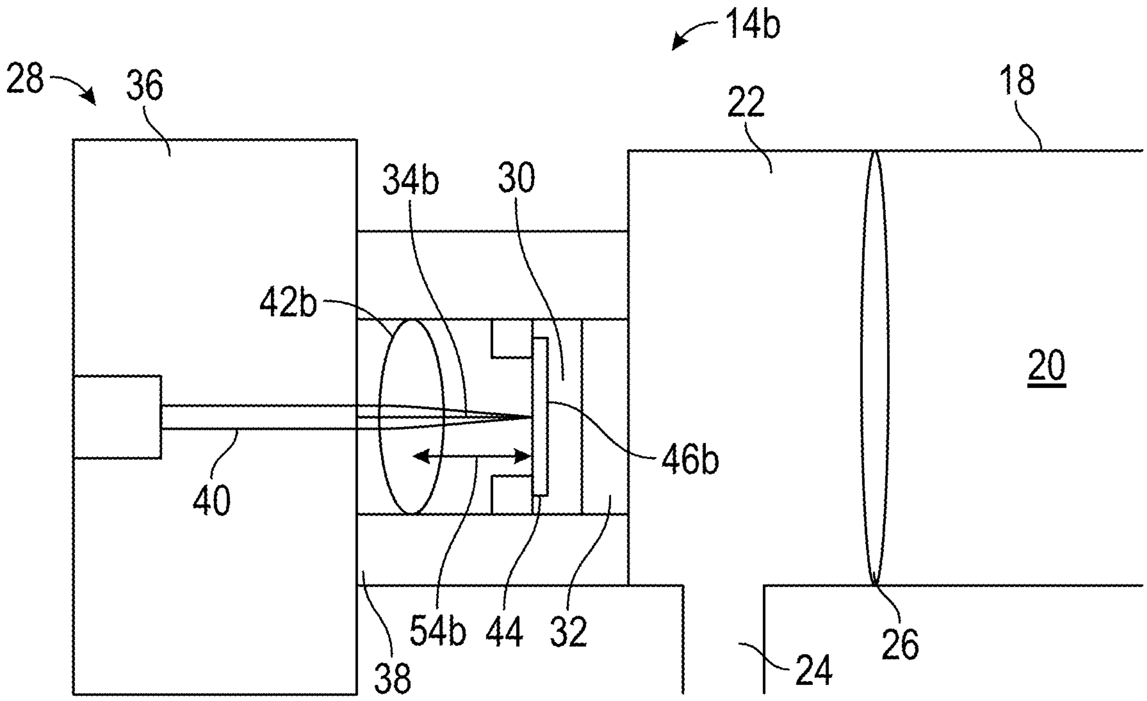
FIG. 5 is a schematic illustration of yet another embodiment of a firing cartridge.

For example, and referring now to FIGS. 4 and 5, a first fire extinguisher **14*a* is configured to be activated by a first light signal 32*a* at a first wavelength, for example, an IR wavelength. Configuring of the fire extinguisher 14*a* is achieved by placement of a first lens 42*a* at a first focal length 54*a* from the bridge wire 44 so that a first focal point 46*a* is located at the bridge wire 44 so that the first light signal 32*a* converges at the bridge wire to sufficiently heat the bridge wire 44 to detonate the ignition charge 30 of the first fire extinguisher 14*a***.

Similarly, a second fire extinguisher **14*b* is configured to be activated by a second light signal 32*b* at a second wavelength, for example, a blue light wavelength. Configuring of the second extinguisher 14*b* is achieved by placement of a second lens 42*b* at a second focal length 54*b* from the bridge wire 44 so that a second focal point 46*b* is located at the bridge wire 44 so that the second light signal 32*b* converges at the bridge wire to sufficiently heat the bridge wire 44 to detonate the ignition charge 30 of the second fire extinguisher 14*b***. It is to be appreciated that the IR wavelength and blue light wavelength are merely exemplary, and that other light signal wavelengths may be utilized.

Figure 6:
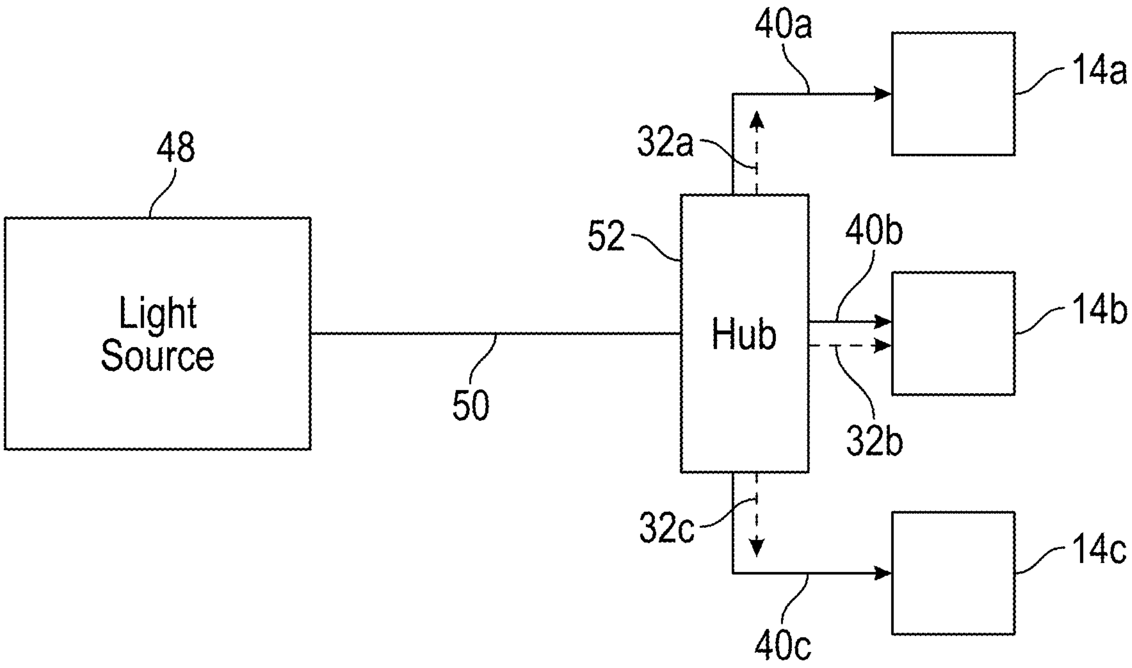
FIG. 6 is another schematic illustration of an embodiment of a fire protection system.

Referring now to FIG. 6, if it is desired to activate the first fire extinguisher **14*a*, for example, the light source 48 emits the first light signal 32*a* along the main optical fiber 50 to the hub 52, and from the hub 52 along the optical fibers 40 to each of the fire extinguishers 14***a*, 14*b*, 14*c*. Because fire extinguisher 14*a* is configured to receive and be activated by the first light signal 32*a* having the first wavelength, first fire extinguisher 14*a* is activated. The remaining fire extinguishers 14*b*, 14*c*, however, are not activated because they are not configured to be activated by the first light signal 32*a*.

Selection of the particular fire extinguisher 14*a*, 14*b*, 14*c* for activation may be made manually by, for example, an operator, or alternatively as a response to detection of a fire or smoke condition by a sensor 56 (shown in FIG. 1) of one or more sensors 56 operably connected to the controller 16 and/or to the light source 48. When the sensor 56 detects a fire or smoke condition, the light source 48 is activated to initiate operation of one or more fire extinguishers 14. In some embodiments, all of the fire extinguishers 14 may be activated, or fire extinguishers 14 may be selectively activated based on a location of the sensor 56 detecting a fire or smoke condition. While the system 12 is described herein as having three fire extinguishers 14, one skilled in the art will readily appreciate that in other embodiments other quantities of fire extinguishers 14 may be utilized.

Fiber optic activation of the fire extinguishers 14 is immune to electrostatic discharge and lightning disruption, and also immune to electromagnetic interference and are unaffected by moisture or gas ingress. Further, optical fibers 40 have a low loss relative to the fiber length, and small size and weight. Further, optical fibers 40 may be utilized safely in environments characterized by hazardous materials and have high sensitivity and have a high degree of long term reliability.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire protection system, comprising:
two or more fire extinguishers, each fire extinguisher of the two or more fire extinguishers including:
a housing, the housing including:
an extinguisher outlet; and
a burst disk, the burst disk configured to retain a volume of fire suppressant material in the housing;
a firing cartridge operably connected to the housing, the firing cartridge including:
an output charge of the firing cartridge; and
an ignition charge that, when detonated, causes release of the output charge to rupture the burst disk and release the volume of fire suppressant material through the extinguisher outlet;
an optical fiber configured to transmit a light signal toward the ignition charge to heat and detonate the ignition charge; and
a light source operably connected to the optical fiber, the light source configured to selectably transmit a first light signal along the optical fiber to activate a first fire extinguisher of the two or more fire extinguishers, or transmit a second light signal to activate a second fire extinguisher of the two or more fire extinguishers.

2. The fire protection system of claim 1, wherein the first light signal is a first wavelength and the second light signal is a second wavelength different from the first wavelength.

3. The fire protection system of claim 1, further comprising a hub disposed between the light source and the optical fiber of each fire extinguisher of the two or more fire extinguishers.

4. The fire protection system of claim 1, wherein each fire extinguisher of the two or more fire extinguishers further includes a bridge wire disposed between the optical fiber and the ignition charge, the light signal configured to heat the bridge wire to detonate the ignition charge.

5. The fire protection system of claim 4, wherein each fire extinguisher of the two or more fire extinguishers includes a lens disposed between the optical fiber and the bridge wire, the lens configured to converge the light signal at the bridge wire to heat the bridge wire.

6. The fire protection system of claim 5, wherein:
the lens of the first fire extinguisher is positioned to converge the first light signal at the bridge wire of the first fire extinguisher; and
the lens of the second fire extinguisher is positioned to converge the second light signal at the bridge wire of the second fire extinguisher.

7. The fire protection system of claim 1, wherein the light source is a laser.

8. The fire protection system of claim 1, further comprising a sensor operably connected to the light source, the sensor configured to detect a fire or smoke condition to initiate operation of the light source.

9. The fire protection system of claim 1, wherein the first light signal is configured to activate the first fire extinguisher but not activate the second fire extinguisher.

10. The fire protection system of claim 1, wherein the first light signal is an IR wavelength and the second light signal is a blue light wavelength.

11. A method of operating a fire protection system, comprising:
providing two or more fire extinguishers, each fire extinguisher of the two or more fire extinguishers including:
a housing, the housing including:
an extinguisher outlet; and
a burst disk, the burst disk configured to retain a volume of fire suppressant material in the housing;
a firing cartridge operably connected to the housing, the firing cartridge including:
an output charge of the firing cartridge; and an ignition charge that, when detonated, causes release of the output charge to rupture the burst disk and release the volume of fire suppressant material through the extinguisher outlet;

selectably transmitting a first light signal or a second light signal different from the first light signal from a light source along an optical fiber toward the ignition charge of a corresponding first fire extinguisher or second fire extinguisher of the two or more fire extinguishers; and heating the ignition charge via the corresponding light signal, thereby detonating the ignition charge of the corresponding first or second fire extinguisher.

12. The method of claim 11, wherein the first light signal is a first wavelength and the second light signal is a second wavelength different from the first wavelength.

13. The method of claim 11, further comprising transmitting the transmitting the first light signal and the second light signal to each of the two or more first extinguishers via a hub disposed between the light source and the optical fiber of each fire extinguisher of the two or more fire extinguishers.

14. The method of claim 11, wherein each fire extinguisher of the two or more fire extinguishers further includes a bridge wire disposed between the optical fiber and the ignition charge, the light signal configured to heat the bridge wire to detonate the ignition charge.

15. The method of claim 14, wherein each fire extinguisher of the two or more fire extinguishers includes a lens disposed between the optical fiber and the bridge wire, the lens configured to converge the light signal at the bridge wire to heat the bridge wire.

16. The method of claim 15, wherein:

the lens of the first fire extinguisher is positioned to converge the first light signal at the bridge wire of the first fire extinguisher; and the lens of the second fire extinguisher is positioned to converge the second light signal at the bridge wire of the second fire extinguisher.

17. An aircraft comprising:

an aircraft structure; and a fire protection system disposed in the aircraft structure, the fire protection system including:

two or more fire extinguishers, each fire extinguisher of the two or more fire extinguishers including:

a housing, the housing including:

an extinguisher outlet; and a burst disk, the burst disk configured to retain a volume of fire suppressant material in the housing;

a firing cartridge operably connected to the housing, the firing cartridge including:

an output charge of a fire extinguishing agent; and an ignition charge that, when detonated, causes release of the output charge to rupture the burst disk and release the volume of fire suppressant material through the extinguisher outlet;

an optical fiber configured to transmit a light signal toward the ignition charge to heat and detonate the ignition charge; and a light source operably connected to the optical fiber, the light source configured to selectably transmit a first light signal to activate a first fire extinguisher of the two or more fire extinguishers, or transmit a second light signal to activate a second fire extinguisher of the two or more fire extinguishers.

18. The aircraft of claim 17, wherein the first light signal is a first wavelength and the second light signal is a second wavelength different from the first wavelength.

19. The aircraft of claim 17, wherein each fire extinguisher of the two or more fire extinguishers further includes a bridge wire disposed between the optical fiber and the ignition charge, the light signal configured to heat the bridge wire to detonate the ignition charge.

* * * * *